Sept. 24, 1929.  K. L. TATE  1,729,299

METHOD OF MAKING THERMOMETRIC BULBS

Filed April 20, 1928

INVENTOR:
Kenneth L. Tate
BY
Alfred Berger
ATTORNEY

Patented Sept. 24, 1929

1,729,299

UNITED STATES PATENT OFFICE

KENNETH L. TATE, OF ROCHESTER, NEW YORK, ASSIGNOR TO TAYLOR INSTRUMENT COMPANIES, OF ROCHESTER, NEW YORK, A CORPORATION OF NEW YORK

METHOD OF MAKING THERMOMETRIC BULBS

Application filed April 20, 1928. Serial No. 271,630.

This invention relates to a method of making steel bulbs for use in mechanical thermometric systems such as solid-filled mercury tube systems.

It is quite a common experience with systems of the type referred to, that leaks develop as the result of the high pressure exerted by the expanding liquid. These leaks usually occur on the bulb or at the joint of the capillary tube and the bulb.

The present invention has for its object a method of making steel bulbs so as to reduce the danger of leaks to a minimum.

For a full disclosure of the invention, its significance and its characteristic features, reference is made to the accompanying drawings, wherein.

In order to fully understand the significance of the present invention, it is necessary to know the methods used in the past and the difficulties encountered.

Figure 1:
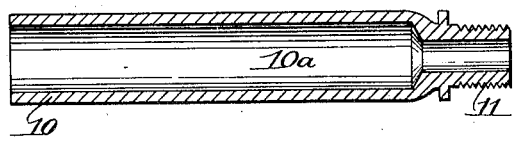
Figs. 1 and 1a are sectional views of a bulb illustrating different stages of one mode of manufacture heretofore practiced.
Figure 1A:
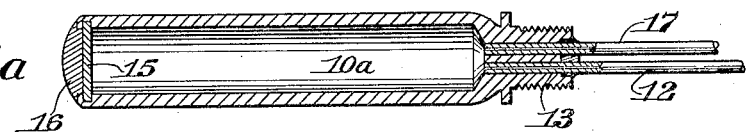

Having reference to Figs. 1 and 1a, 10 represents a rod of steel into which the well 10a is drilled to form the bulb chamber. The front end is being reduced and machined to receive the threads 11 and also drilled to receive the capillary 12. The latter is forced into the bore 13 and then brazed to the bulb. The rear end receives a plug 15, whereupon the metal of the bulb is swaged over the plug and another piece of the metal 16 is placed at the end and united by welding with the bulb. A filler tube 17 is commonly brazed or welded into the bulb together with the capillary.

This bulb thus made has been found to be susceptible to leakage at the plugged end. The welding, which is carried out by means of a torch, evidently is likely to leave interspaces, channels or the like reducing the resistance to leakage under the pressure of 2,000 pounds per inch or more.

Another advantage is the difficulty of making a good welding or brazing connection at the junction of the capillary and the filler tube with the bulb.

Figure 2:
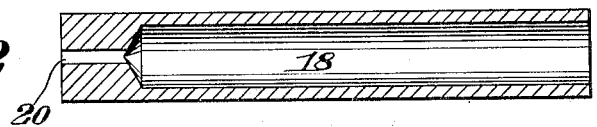
Figs. 2 and 2a are similar views illustrating another mode of manufacture heretofore practiced.
Figure 2A:
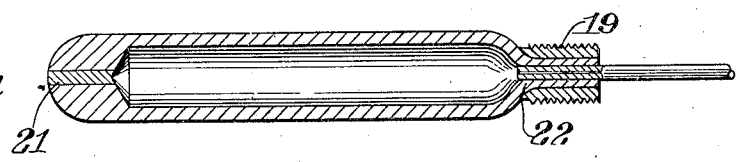

In Figs. 2 and 2a, a rod of steel is drilled from the front end to provide the bulb chamber 18. The tube thus formed is then contracted under tremendous force and a threaded collar or sleeve 19 is shrunk over the contracted portion or otherwise connected to it. The contracted portion is then drilled to receive the capillary which is usually brazed in position as before mentioned. The rear end is usually rounded off and drilled to provide a filler opening 20 which, after the system is filled, is plugged up by means of plug 21 welded in place.

This system, as experience has shown, sometimes develops leaks at the contracted portion 22, which is probably due to the formation of folds and pockets during the contracting action.

Both systems referred to have, in addition, the disadvantage that the drilling of the well from one end is tedious and costly, since the steel which is stainless steel or the like, is exceedingly hard and tough and the difficulties increase with the depth of the well.

Figure 3:
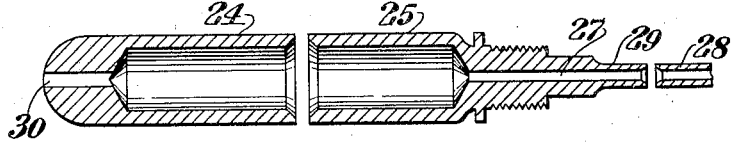
Fig. 3 is a sectional view of parts illustrating the most important stage in the execution of the present invention.
Figure 4:
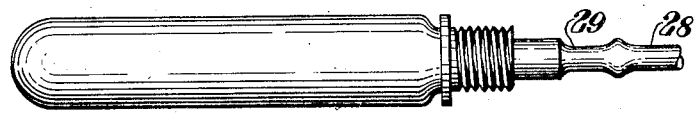
Fig. 4 is an elevational view showing the bulb produced by the connection of the parts shown in Fig. 3.

Having now reference to Figs. 3 and 4, I propose to make the bulb of two separate parts 24 and 25. Each part is drilled from one end and the two parts are then united to form the bulb chamber, preferably by resistance welding. This form of weld is exceedingly simple and uniform throughout. Both the rear and the front end are of solid metal in its original form. They are just finished by machining or otherwise without any danger of weakening the structure.

The front end is drilled to provide a fine bore 27 for connection with the capillary 28. Instead of forcing the capillary tube into the bulb as previously described, I unite the capillary tube 28 with the reduced end 29 of the bulb also by resistance welding.

The rear is provided with a filler bore 30 which is subsequently plugged up.

The bulb made by my method as described is singularly free from defects such as pointed out in connection with the methods previously used. The bulb is simpler and cheaper to produce and easier to assemble to the other parts of the system.

I claim:

1. In a process of making a capillary system of the type described, the steps which consist in drilling a solid rod member to define a portion of a bulb chamber and a capillary conduit extending from the end wall thereof, reducing the end of the rod which defines the capillary conduit and connecting a capillary tube to the reduced end.

2. In a process of making a capillary system of the type described, the steps which consist in drilling two solid rod members from one end to define portions of a bulb chamber, a capillary conduit extending from the end wall of one of said portions and a bore from the end wall of the other portion, welding the two members together to form the chamber, reducing the end of the rod which defines the capillary conduit and connecting a capillary tube to the reduced end.

In testimony whereof I affix my signature.

KENNETH L. TATE.